United States Patent [19]

Inoue

[11] Patent Number: 5,656,913
[45] Date of Patent: Aug. 12, 1997

[54] MICROCOMPUTER FOR DRIVING INDUCTION MOTOR

[75] Inventor: Naoki Inoue, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 539,253

[22] Filed: Oct. 5, 1995

[30] Foreign Application Priority Data

Oct. 6, 1994 [JP] Japan ................................. 6-242980

[51] Int. Cl.$^6$ ..................................................... H02P 5/28
[52] U.S. Cl. ........................... 318/811; 318/567; 318/269; 318/600; 318/727
[58] Field of Search ........................... 318/811, 798–815, 318/562, 567, 569, 600, 727, 254, 434, 138; 364/243, 243.3

[56] References Cited

U.S. PATENT DOCUMENTS

| | | | |
|---|---|---|---|
| 4,428,053 | 1/1984 | Tol | 318/600 X |
| 4,600,872 | 7/1986 | Shepard, Jr. | 318/600 X |
| 4,628,380 | 12/1986 | Quackenbush | 318/562 X |
| 4,713,718 | 12/1987 | Quayle | 318/439 X |
| 4,757,242 | 7/1988 | Prather | 318/798 X |

FOREIGN PATENT DOCUMENTS

| | | |
|---|---|---|
| 57-78389 | 5/1982 | Japan . |
| 60-200773 | 10/1985 | Japan . |
| 61-109493 | 5/1986 | Japan . |

*Primary Examiner*—Karen Masih
*Attorney, Agent, or Firm*—Lowe, Price, LeBlanc & Becker

[57] ABSTRACT

A microcomputer has a timer register 10 for storing period data of a carrier, timer registers 4A and 4B for individually storing positive phase and negative phase time width data of a control signal which is synchronized with the carrier, and an operation unit 13 for subtracting the value of the positive phase time width data of the control signal from a value of the period data. The time width data obtained as a subtraction result is supplied to the timer register 4B. The load on the CPU when the revolution of an induction motor is controlled is reduced.

12 Claims, 5 Drawing Sheets

MICROCOMPUTER FOR DRIVING INDUCTION MOTOR

BACKGROUND OF THE INVENTION

1. Field of the Invention

The invention relates to a microcomputer for driving induction motor, and more particularly, to a microcomputer which outputs a control signal for controlling the driving of induction motor.

2. Description of the Related Art

Conventionally, in a servo system of a three-phase induction motor, a driving control method utilizing a PWM (Pulse Width Modulation) wave, i.e., a so-called carrier driving control method is frequently adopted, because the method can relatively easily attain digital control. In such a driving control method, the period of a carrier is variable, and the time width (duty cycle) of a pulse generated in synchronous with the carrier is controlled, thereby obtaining a control signal. The driving of the three-phase motor is controlled on the basis of the control signal.

FIG. 1 is a block diagram showing a configuration of a conventional microcomputer for driving induction motor, which outputs a control signal for controlling the driving of a three-phase motor M. The conventional microcomputer for driving induction motor mainly consists of four timers 1, 2A, 2B and 2C, a three-phase wave-form generating circuit 3, and a CPU 5 which manages the whole control.

The timer 1 is used for determining the period of a carrier. Specifically, a clock signal CLK is supplied to the timer 1 as a count source. An operation of outputting a high-level pulse of an overflow signal OVF when the count value reaches a predetermined value is repeated, so as to determine the period of the carrier. The timer 1 outputs an interrupt signal INT to the CPU 5 at a rate of one pulse per two pulses of the overflow signal OVF.

The timers 2A, 2B and 2C correspond to three phases U, V and W of the control signal, respectively. Each timer determines the time width of a pulse of the control signal in the corresponding phase which is synchronized with the carrier.

The three-phase wave-form generating circuit 3 generates three phase control signals U, V and W and their inversion control signals #U, #V and #W, in accordance with the outputs of the timers 2A, 2B and 2C. The control signals outputted from the three-phase wave-form generating circuit 3 are supplied to a motor control circuit 3 which is disposed outside the microcomputer, and the driving of the three-phase motor M is controlled by the output of the motor control circuit 3.

The timers 2A, 2B and 2C which respectively correspond to the three phases U, V and W of the control signal have identical configurations. Herein, therefore, the timer 2A for the U phase is exemplarily described.

The timer 2A mainly consists of two timer registers 4A and 4B, a selector 4C, a reload register 4D, and a counter 4E.

The timer registers 4A and 4B store data supplied from the CPU 5. The data supplied from the CPU 5 to the timer registers 4A and 4B are the data for determining the time width of a pulse of the control signal for the U phase. In the following description, such data is referred to as time width data. Either of the time width data stored in the timer register 4A and that stored in the timer register 4B is selected by the selector 4C.

The selector 4C operates at falling timing of the pulse of the overflow signal OVF outputted from the timer 1. At each operation, the selector 4C alternately selects and outputs the time width data stored in the timer register 4A and that stored in the timer register 4B. The time width data selected by the selector 4C is supplied to the reload register 4D and held thereby.

The reload register 4D operates at rising timing of the pulse of the overflow signal OVF outputted from the timer 1, and outputs the held data which is then supplied to the counter 4E.

A trigger terminal TG of the counter 4E receives the overflow signal OVF outputted from the timer 1. The counter 4E regards the rising edge of the high-level pulse of the overflow signal OVF as a trigger, and starts the operation of counting the clock signal CLK supplied as the count source. The count operation of the counter 4E is continued until the count value reaches the data supplied from the reload register 4D. During the count operation, the counter 4E outputs a high-level signal. During the period from the termination of the count operation to the start of the next count operation (the rising timing of the pulse of the overflow signal OVF), the counter 4E outputs a low-level signal. The output of the counter 4E is supplied to the three-phase wave-form generating circuit 3 as an output OUT2A of the timer 2A.

The timers 2B and 2C output their outputs OUT2B and OUT2C and supply them to the three-phase wave-form generating circuit, in the same way as the above-described timer 2A.

Next, the operation of the conventional microcomputer for driving induction motor shown in FIG. 1 will be described.

The microcomputer operates as a whole in the following manner.

The timer 1 generates a high-level pulse of the overflow signal OVF for each overflow of its time count value. The pulse of the overflow signal OVF is supplied to the timers 2A, 2B and 2C. Accordingly, the timers 2A, 2B and 2C start their time count operations for respective predetermined time periods, and output signals OUT2A, OUT2B and OUT2C of pulses which have predetermined time widths and which are synchronized with the carrier, to the three-phase wave-form generating circuit 3. By repeating such the operation, the three-phase wave-form generating circuit 3 generate and output the control signals U, V and W, and #U, #V and #W respectively corresponding to the three phases U, V and W. The three phase control signals U, V and W, and #U, #V and #W outputted from the three-phase wave-form generating circuit 3 are supplied to the motor control circuit 30. The driving of the three-phase motor M is controlled by the output of the motor control circuit 30.

Next, with reference to a timing chart of FIG. 2 showing the states of the signals in various portions, the operations of determining the time widths of the positive phase control signals U, V and W and the negative phase signals #U, #V and #W in the respective three phases will be described by way of an example of the U phase.

It is assumed that the time width data are previously supplied from the CPU 5 and stored in the timer registers 4A and 4B, and the time width data stored in the timer register 4A is loaded to the reload register 4D through the selector 4C and stored therein.

At first, at timing t1 shown in FIG. 2, the timer 1 outputs the overflow signal OVF and the interrupt signal INT. Accordingly, the time width data which has been loaded from the timer register 4A to the reload register 4D is reloaded from the reload register 4D to the counter 4E at the rising timing t1 of the overflow signal OVF. In addition, at the rising timing t1 of the pulse of the overflow signal OVF, the counter 4E starts the count operation, and starts to output a high-level signal. Accordingly, a one-shot signal P1 which, as shown in FIG. 2, is synchronized with the carrier and has a time width corresponding to the time width data stored in the timer register 4A is outputted from the counter 4E to the three-phase wave-form generating circuit 3 as the output signal OUT2A.

At the timing t1, also the interrupt signal INT is outputted from the timer 1 and supplied to the CPU 5. In response to the signal, the CPU 5 calculates the time width data which will be loaded to the timer registers 4A and 4B of the timer 2A at the next time, and also the time width data which will be loaded to the two timer registers respectively included in the other timers 2B and 2C at the next time. In addition, the CPU 5 performs the processing for loading a total of six data to the corresponding six timer registers, before the next overflow signal OVF is inputted.

At falling timing t11 of the pulse of the overflow signal OVF, the selector 4C is activated to perform the switching operation, so that the time width data stored in the timer register 4B is loaded to and held by the reload register 4D.

When the count operation of the counter 4E is terminated at timing t12, in other word, when the count value of the counter 4E reaches the value which is previously reloaded from the reload register 4D, the counter 4E starts to output a low-level signal.

When the timer 1 outputs the next pulse of the overflow signal OVF, the time width data which has already been loaded from the timer register 4B to the reload register 4D is reloaded to the counter 4E at the rising timing t2 of the high-level pulse shown in FIG. 2. At timing t2, the interrupt signal INT is not outputted. The counter 4E starts the count operation at the rising timing t2 of the pulse of the overflow signal OVF, and starts to output a high-level signal. Accordingly, a one-shot signal P2 which, as shown in FIG. 2, is synchronized with the carrier and has a time width corresponding to the time width data stored in the timer register 4B is outputted from the counter 4E to the three-phase wave-form generating circuit 3 as the output signal OUT2A.

At falling timing t21 of the second pulse of the overflow signal OVF, the selector 4C is activated to perform the switching operation, so that the time width data stored in the timer register 4A is transferred to and held by the reload register 4D.

When the count operation of the counter 4E is terminated at timing t22, in other words, when the count value of the counter 4E reaches the value which is previously reloaded from the reload register 4D, the counter 4E starts to output a low-level signal.

At the same time when the next pulse of the overflow signal OVF is outputted, the interrupt signal INT is outputted so that the time width data of the timer registers 4A and 4B are updated to new data.

By repeating such the operation, the CPU 5 sequentially rewrites the values of the time width data in the timer registers 4A and 4B, so as to control the time widths (the pulse widths) of the one-shot signals P1 and P2 which are the output signal OUT2A of the counter 4E.

When these one-shot signals P1 and P2 which are the output OUT2A of the timer 2A are supplied to the three-phase wave-form generating circuit 3, as shown in FIG. 2, the three-phase wave-form generating circuit 3 generates a U-phase control signal U which falls at the falling timing t12 of the one-shot signal P1 and rises at the falling timing t22 of the one-shot signal P2. The three-phase wave-form generating circuit 3 generates also a U-phase inversion control signal #U which rises at the falling timing t12 of the one-shot signal P1 and falls at the falling timing of the one-shot signal P2.

The control signals V and W, and their inversion control signals #V and #W for the V and W phases other than the U phase are also generated in the same way.

On the other hand, in addition to the above-described prior art, a control method for an induction motor in which the driving of a three-phase motor is controlled by a microcomputer using a PWM wave is disclosed in Japanese Patent Application Laid-Open No. 57-78389 (1982), an apparatus for driving an induction motor is disclosed in Japanese Patent Application Laid-Open No. 61-109493 (1986), and an inverter control apparatus is disclosed in Japanese Patent Application Laid-Open No. 60-200773 (1985).

The above-described control by the CPU 5 for determining the time widths of the one-shot signals P1 and P2 necessitates the processing including 12 steps of the following step 1 to step 12:

Step 1: Calculation of time width data to be written into one timer register 4A of the timer 2A for U-phase.

Step 2: Calculation of time width data to be written into the other time register 4B of the timer 2A for U-phase.

Step 3: Calculation of time width data to be written into one timer register of the timer 2B for V-phase.

Step 4: Calculation of time width data to be written into the other timer register of the timer 2B for V-phase.

Step 5: Calculation of time width data to be written into one timer register of the timer 2C for W-phase.

Step 6: Calculation of time width data to be written into the other timer register of the timer 2C for W-phase.

Step 7: Writing of the calculation result to the one timer register 4A of the timer 2A for U-phase.

Step 8: Writing of the calculation result to the other timer register 4B of the timer 2A for U-phase.

Step 9: Writing of the calculation result to the one timer register of the timer 2B for V-phase.

Step 10: Writing of the calculation result to the other timer register of the timer 2B for V-phase.

Step 11: Writing of the calculation result to the one timer register of the timer 2C for W-phase.

Step 12: Writing of the calculation result to the other timer register of the timer 2C for w-phase.

Because the control necessitates the processing of these 12 steps, the load on the CPU 5 is remarkably increased, and there is a fear that there is no margin for performing other processing. In addition, it is necessary for the CPU 5 to complete the processing within the time interval between the reception of the pulse of the interrupt signal INT from the timer 1 and that of the next pulse of the overflow signal OVF from the timer 1. Accordingly, the period of the carrier set by the timer 1, i.e., the period of the overflow of the timer 1 cannot be shorter than the time period required for completing the processing of the 12 steps. Consequently, the frequency of the carrier is limited, so that there arises a problem in that it is difficult to more smoothly control the revolution of the three-phase motor.

On the other hand, in the control method for an induction motor disclosed in Japanese Patent Application Laid Open No. 57-78389 (1982), a current instruction having an accurate sinusoidal waveform without any distortion even in higher frequencies is generated. In the apparatus for driving an induction motor disclosed in Japanese Patent Application Laid-Open No. 61-109493 (1986), the control which is matched with a DC motor control can be applied to a general-purpose AC motor. In the inverter control apparatus disclosed in Japanese Patent Application Laid-Open No. 60-200773 (1985), the capacity of the storage unit which stores combinations of ON-OFF states of a plurality of switching elements constituting a three-phase bridge can be reduced. Accordingly, none of the above-described inventions have been conducted so as to reduce the load on the CPU and increase the frequency of the carrier in the control of the driving of an induction motor.

Hence, in the timing chart of FIG. 2, at the timing of t1, that is, the timing at which the timer 1 generates the interrupt signal INT, the CPU 5 performs an operation for obtaining data corresponding to the period (a) of the output signal OUT2A of the timer 2A, and stores the operation result into the timer register 4A of the timer 2A. Next, the CPU 5 performs an operation for obtaining data corresponding to the period (c) of the output signal OUT2A of the timer 2A, and stores the operation result into the timer register 4B of the timer 2A.

Here, low level period (c+cc) of the wave-form of the U phase of the control signal, that is, high level period of the wave-form of the #U phase which is the inverted phase of the U phase is determined by following equation.

$$\text{period } (b) - \text{period } (a) + \text{period } (c)$$

In driving control of the general three-phase motor, following equation is established.

$$\text{period } (b) - \text{period } (a) = \text{period } (c)$$

In addition, because the period (b) which is the cycle of the carrier is constant, when the value (which corresponds to the period (a)) to be stored in the timer register 4A is determined, the value (which corresponds to the period (c)) to be stored in the timer register 4B is determined uniquely by the subtraction of above equation.

SUMMARY OF THE INVENTION

The invention has been conducted in view of the above-described circumstances. It is an object of the invention to provide a microcomputer for driving induction motor in which the load on a CPU can be reduced and the frequency of a carrier for generating a control signal can be increased when the driving of the induction motor is controlled.

The microcomputer for driving induction motor according to the invention comprises: first storing means for storing time width data of a positive phase (or a negative phase) of a control signal which is synchronized with a carrier; calculating means for subtracting a value of the time width data stored in the first storing means from a value of period data of the carrier; and second storing means for storing the calculation result.

In the microcomputer for driving induction motor of the invention, a period data output unit outputs period data of the carrier. When a CPU controls the first storing means so as to store positive phase time width data of the control signal which is synchronized with the carrier, the calculating means subtracts the value of the time width data stored in the first storing means from the value of the period data of the carrier, and the time width data after the calculation is stored in the second storing means.

Accordingly, it is required only to write the time width data in the positive phase (or the negative phase) of the control signal into the first storing means, and hence the load on the CPU is reduced. In addition, the control operation time of the CPU is shortened and hence the frequency of the carrier can be increased.

In a first aspect of the microcomputer for driving induction motor of the invention, a first register is used as the first storing means and a second register is used as the second storing means. The first register (or the second register) stores the time width data in the positive phase (or the negative phase) of the control signal which is synchronized with the carrier. An operation unit subtracts the value of the time width data stored in the first register (or the second register) from the value of the period data of the carrier. The obtained result is stored in the second register as time width data in the negative phase (or the positive phase).

According to the first aspect of the microcomputer for driving induction motor of the invention, a period data output unit outputs the period data of the carrier. When the CPU controls the first register (or the second register) so as to store the positive phase (or negative phase) time width data of the control signal which is synchronized with the carrier, the operation unit subtracts the value of the time width data stored in the first register (or the second register) from the value of the period data of the carrier, and the time width data after the calculation is stored in the second register (or the first register) as time width data in the negative phase (or the positive phase).

Accordingly, it is required only to write the time width data in the positive phase (or the negative phase) of the control signal into the first register (or the second register), and hence the load on the CPU is reduced. In addition, the control operation time of the CPU is shortened and hence that the frequency of the carrier can be increased.

In a second aspect of the microcomputer for driving induction motor of the invention, a register is used as the first storing means and a latch circuit incorporated in an operation unit is used as the second storing means. The register stores the time width data in the positive phase (or the negative phase) of the control signal which is synchronized with the carrier. The operation unit subtracts a value of the time width data stored in the register from a value of the period data of the carrier. The obtained result is stored in the latch circuit as time width data in the negative phase (or the positive phase).

According to the second aspect of the microcomputer for driving induction motor of the invention, a period data output unit outputs the period data of the carrier. When the CPU controls the register so as to store the positive phase or negative phase time width data of the control signal which is synchronized with the carrier, the operation unit subtracts the value of the time width data stored in the register from the value of the period data of the carrier, and the time width data after the calculation is held by the latch circuit. The time width data held by the latch circuit is supplied to a counter as time width data in the negative phase (or the positive phase).

Accordingly, only one register is required for storing time width data, so that the microcomputer can be reduced in size. Since the time width data is required to be written into only one register, the load on the CPU is reduced. In addition, the control operation time of the CPU is shortened, and hence the frequency of the carrier can be increased.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing embodiments thereof.

First Embodiment

Figure 1:
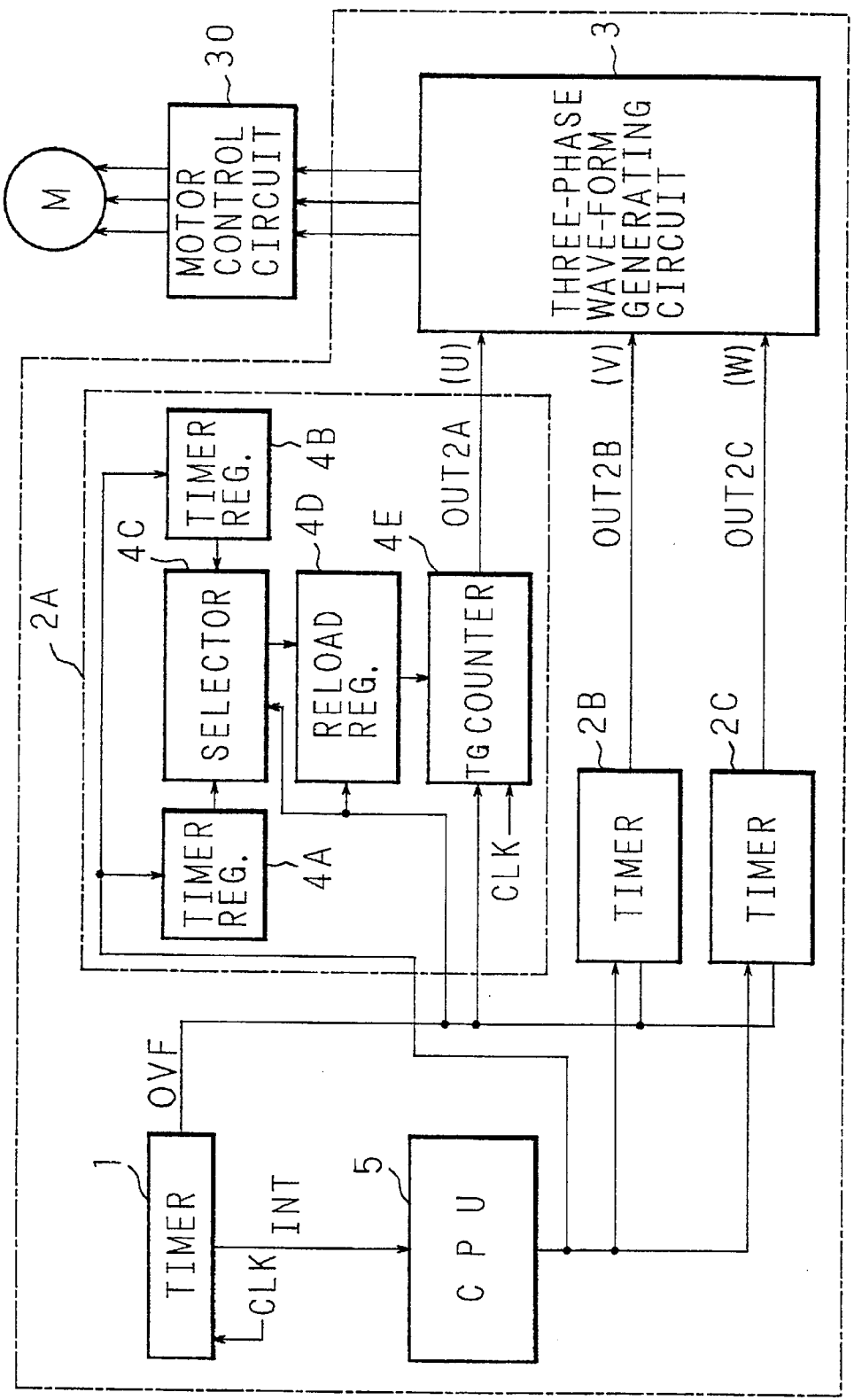
FIG. 1 is a block diagram showing a configuration of a conventional microcomputer for driving induction motor.
Figure 2:
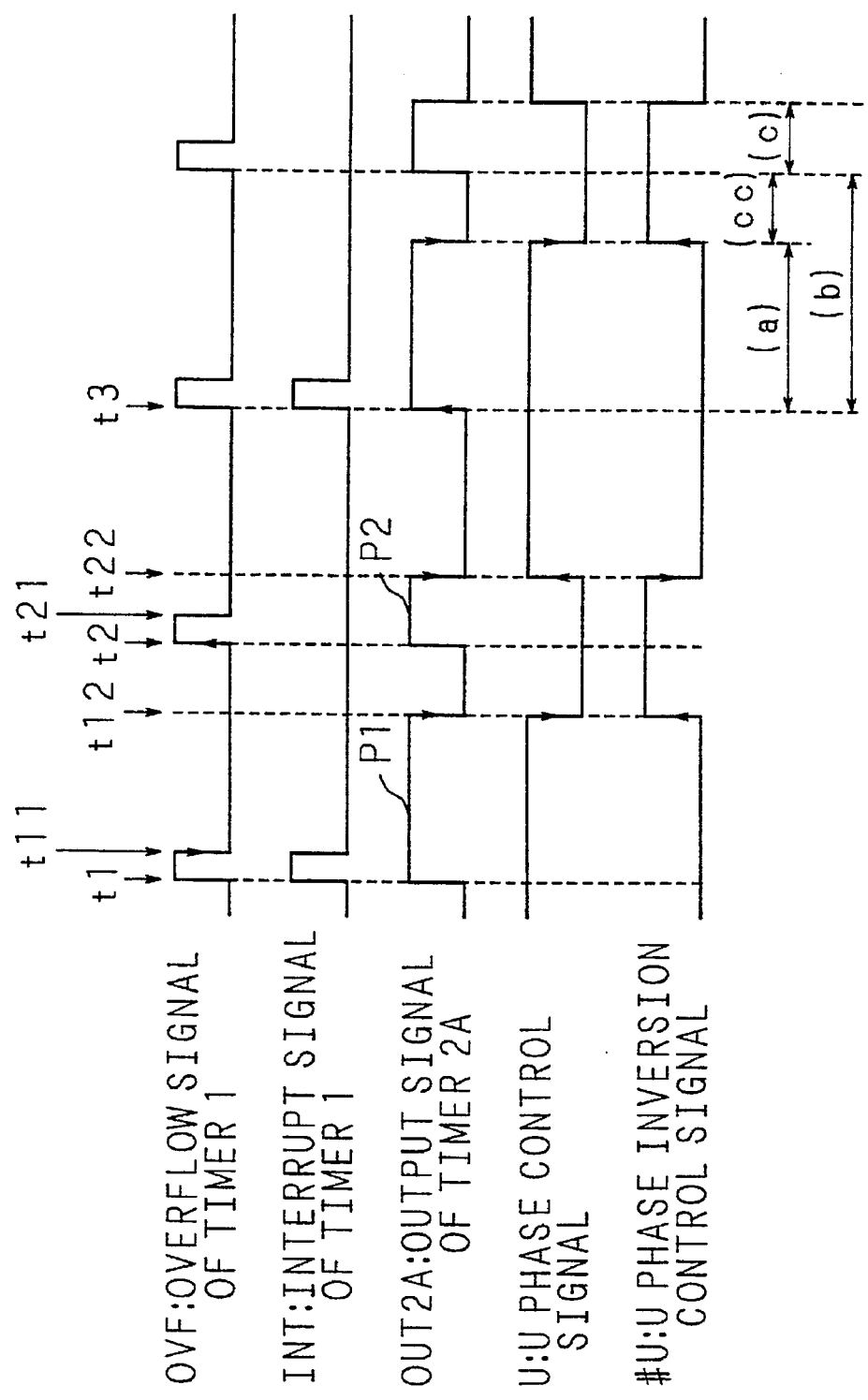
FIG. 2 is a timing chart showing states of signals in various portions of the conventional microcomputer for driving induction motor.
Figure 3:
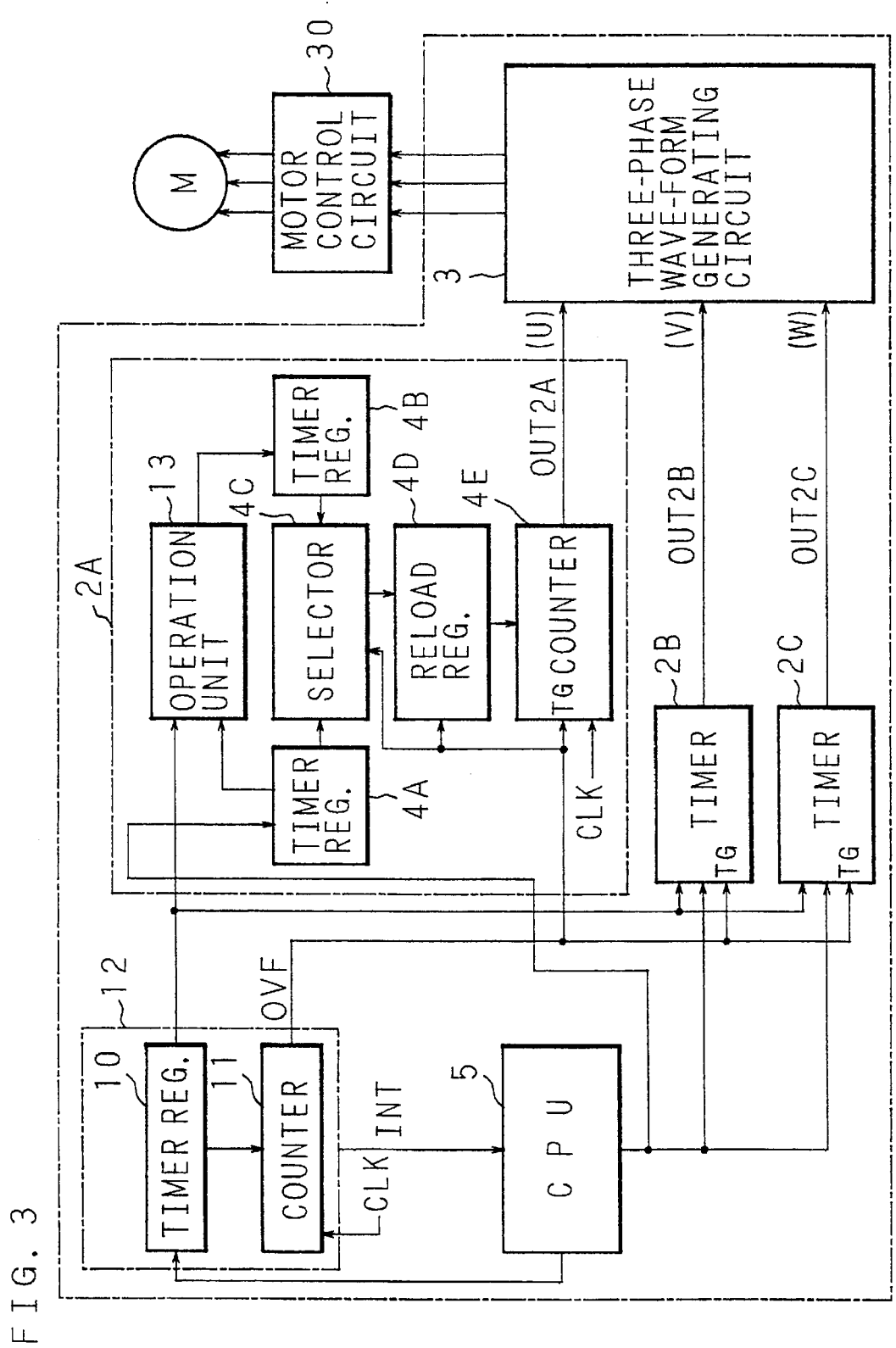
FIG. 3 is a block diagram showing a configuration example of a first invention of the microcomputer for driving induction motor according to the invention.

FIG. 3 is a block diagram showing a configuration example of a first embodiment of the microcomputer for driving induction motor according to the invention.

The first embodiment of the microcomputer for driving induction motor of the invention mainly comprises a period data output unit 12 which is an interval timer, three timers 2A, 2B and 2C, a three-phase wave-form generating circuit 3, and a CPU 5 which manages the whole control. The first embodiment is different from the above-described prior art in that the period data output unit 12 is used instead of the timer 1 disposed in the prior art.

The period data output unit 12 comprises a timer register 10 for storing period data of a carrier, and a counter 11 for counting a value of the period data stored in the timer register 10.

The period data output unit 12 is used for determining the period of the carrier. Specifically, a clock signal CLK is supplied to the counter 11 of the period data output unit 12 as a count source. When the count value of the counter 11 reaches the value held by the timer register 10, a high-level pulse of an overflow signal OVF is outputted, thereby determining the period of the carrier. The period data output unit 12 outputs an interrupt signal INT to the CPU 5 at a rate of one pulse per two pulses of the overflow signal OVF.

The timers 2A, 2B and 2C correspond to three phases U, V and W, respectively, and determine the time widths of pulses of the respective phases U, V and W which are synchronized with the carrier. The period data generated by the timer register 10 is commonly supplied to the timers 2A, 2B and 2C.

The three-phase wave-form generating circuit 3 generates three phase control signals U, V and W in accordance with the respective outputs of the timer 2A, 2B and 2C. The control signals U, V and W outputted from the three-phase wave-form generating circuit 3 are supplied to a motor control circuit 30. The driving of a three-phase motor M is controlled by the output of the motor control circuit 30.

The timers 2A, 2B and 2C are identical in configuration. In the following description, therefore, the timer 2A is exemplarily described.

The timer 2A comprises timer registers 4A and 4B, a selector 4C, a reload register 4D, a counter 4E, and an operation unit 13.

The timer register 4A stores time width data supplied from the CPU 5. The time width data stored in the timer register 4A is outputted to the selector 4C and the operation unit 13. The timer register 4B stores data of results of calculation conducted by the operation unit 13. Either of the stored data of the timer register 4A and that of the timer register 4B is selected by the selector 4C.

The selector 4C operates at falling timing of a pulse of the overflow signal OVF outputted from the counter 11, and alternately selects and outputs the stored data of the timer register 4A and that of the timer register 4B. The stored data of the timer register 4A or that of the timer register 4B which is selected by the selector 4C is supplied to the reload register 4D and held thereby.

The reload register 4D operates at rising timing of the pulse of the overflow signal OVF outputted from the counter 11, and outputs the held data which is then supplied to the counter 4E.

A trigger terminal TG of the counter 4E receives the overflow signal OVF which is outputted from the counter 11. The counter 4E regards the rising edge of the high-level pulse of the overflow signal OVF as a trigger, and performs the operation of counting the clock signal CLK supplied as the count source until the count value reaches the data supplied from the reload register 4D. During the count operation, the counter 4E outputs a high-level signal. During the time interval from the termination of the count operation to the start of the next count operation (the rising timing of the pulse of the overflow signal OVF), the counter 4E outputs a low-level signal. The output of the counter 4E is the output of the timer 2A, and it is then supplied to the three-phase wave-form generating circuit 3 as the U-phase control signal U.

The operation unit 13 receives period data of the carrier from the timer register 10, and time width data which is stored in the timer register 4A and which will be used for determining the positive phase time width of the U-phase control signal.

The operation unit 13 subtracts the value of the time width data held by the timer register 4A from a value of the period data supplied from the period data output unit 12. The data of the subtraction result is held by the timer register 4B as the time width data.

Figure 4:
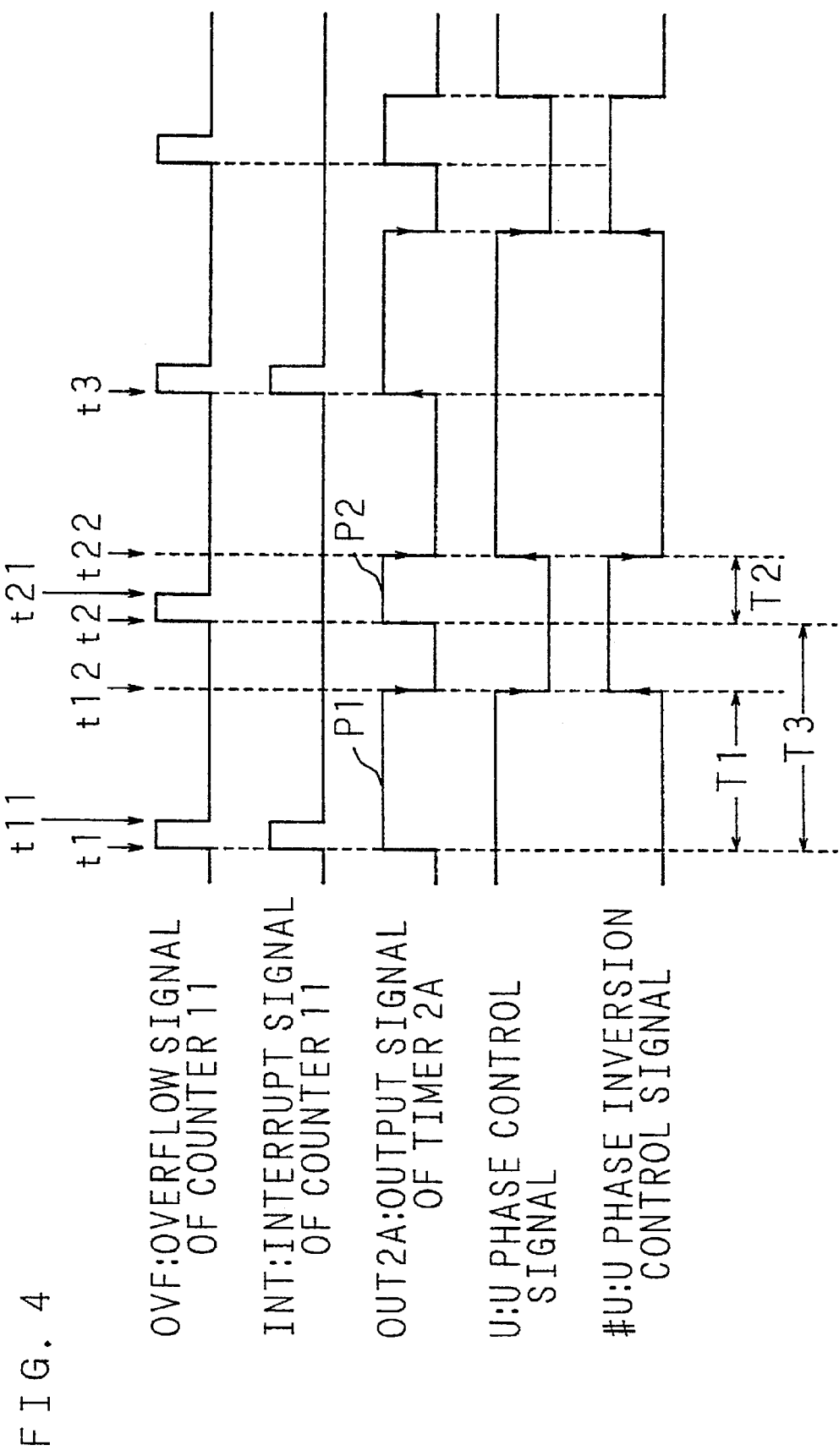
FIG. 4 is a timing chart showing states of signals in various portions of the microcomputer of the first invention.

Next, the operation of the first embodiment of the microcomputer for driving induction motor according to the invention having the above-described configuration will be described with reference to the timing chart of FIG. 4 showing the states of signals in various portions.

It is assumed that the time width data is previously supplied from the CPU 5 and stored in the timer registers 4A and 4B, and the time width data stored in the timer register 4A is selected by the selector 4C and loaded to and stored in the reload register 4D.

The period data output unit 12 reloads the period data of the carrier which is set in the timer register 10 by the CPU 5, to the counter 11 which in turn performs the count operation. When the count value of the counter 11 is overflowed, the counter 11 outputs the overflow signal OVF as shown in FIG. 4. At the same time, the period data of the timer register 10 is again reloaded, and the counter 11 repeats the count operation. As shown in FIG. 4, each time when the overflow signals OVF are generated twice, the interrupt signal INT is generated once and supplied to the CPU 5.

When the counter 11 outputs the overflow signal OVF and the interrupt signal INT, the time width data which has already been loaded to the reload register 4d from the timer register 4A is reloaded to the counter 4E from the reload register 4D at rising timing t1 of the overflow signal OVF shown in FIG. 4. The counter 4E starts the count operation at the rising timing t1 of the pulse of the overflow signal OVF, and outputs a high-level signal. Accordingly, a one-shot signal P1 (whose time width is T1) which, as shown in FIG. 4, is synchronized with the carrier and has a time width corresponding to the time width data stored in the timer register 4A is outputted from the counter 4E to the three-phase wave-form generating circuit 3 as the output signal OUT2A.

At falling timing t11 of the pulse of the overflow signal OVF, the selector 4C is activated to perform the switching operation, so that the time width data stored in the timer register 4B is loaded to and held by the reload register 4D.

When the count operation of the counter 4E is terminated at timing t12, in other words, when the count value of the counter 4E reaches the value which is previously reloaded from the reload register 4D, the output signal OUT2A of the counter 4E becomes low level.

When the counter 11 outputs the next overflow signal OVF, the time width data stored in the reload register 4D is reloaded to the counter 4E at rising timing t2 of the high-level pulse shown in FIG. 4. The counter 4E starts the count operation, and supplies a one-shot signal P2 (whose time width is T2) shown in FIG. 4 to the three-phase waveform generating circuit 3. At the same time, the operation unit 13 subtracts the value of the time width data stored in the timer register 4A from the value of the period data (whose period time is T3) stored in the timer register 10, and supplies the time width data as the subtracted result to the timer register 4B. At the falling timing of the overflow signal OVF, the selector 4C performs the switching operation, so as to transfer the time width data in the timer register 4A to the reload register 4D. These operations are repeated, and the CPU 5 rewrites the time width data in the timer register 4A, whereby the time widths (pulse widths) of the one-shot signals P1 and P2 shown in FIG. 4 are controlled.

When the one-shot signals P1 and P2 which are the output OUT2A of the timer 2A are supplied to the three-phase wave-form generating circuit 3, as shown in FIG. 4, the three-phase wave-form generating circuit 3 generates a positive phase control signal U of the U-phase control signal which falls at falling timing t12 of the one-shot signal P1 and rises at falling timing t22 of the one-shot signal P2. Also, the three-phase wave-form generating circuit 3 generates a U-phase inversion control signal #U which rises at falling timing t12 of the one-shot signal P1 and falls at falling timing t22 of the one-shot signal P2.

As described above, when the CPU 5 writes the time width data into only the timer register 4A in accordance with the programs, the time width data is calculated by the operation unit 13 and supplied to the timer register 4B irrespective of the programs. In the microcomputer for driving induction motor of the invention, the two timer registers 4A and 4B are disposed in the same manner as in the prior art. However, the operation unit 13 for subtracting the time width data stored in the timer register 4A from the period data is disposed, so that the programs are not required to perform the calculation for determining the value of the time width data to be stored in the timer register 4B by the CPU, and to perform the operation of writing the calculated time width data into the timer register 4B. Therefore, the load on the CPU 5 is reduced.

The timers 2B and 2C operate in the same manner as the timer 2A. Consequently, the programs are not required to perform the calculation for determining the value of the time width data to be stored in the timer register, and the operation of writing the calculation result into the timer register. Accordingly, the load on the CPU 5 can be significantly reduced.

The time period of the control performed by the CPU 5 is shortened, so that the period of the carrier can be further shortened. Thus, the frequency of the carrier can be increased, whereby the revolution of the three-phase motor M can be smoothly controlled.

Second Embodiment

Figure 5:
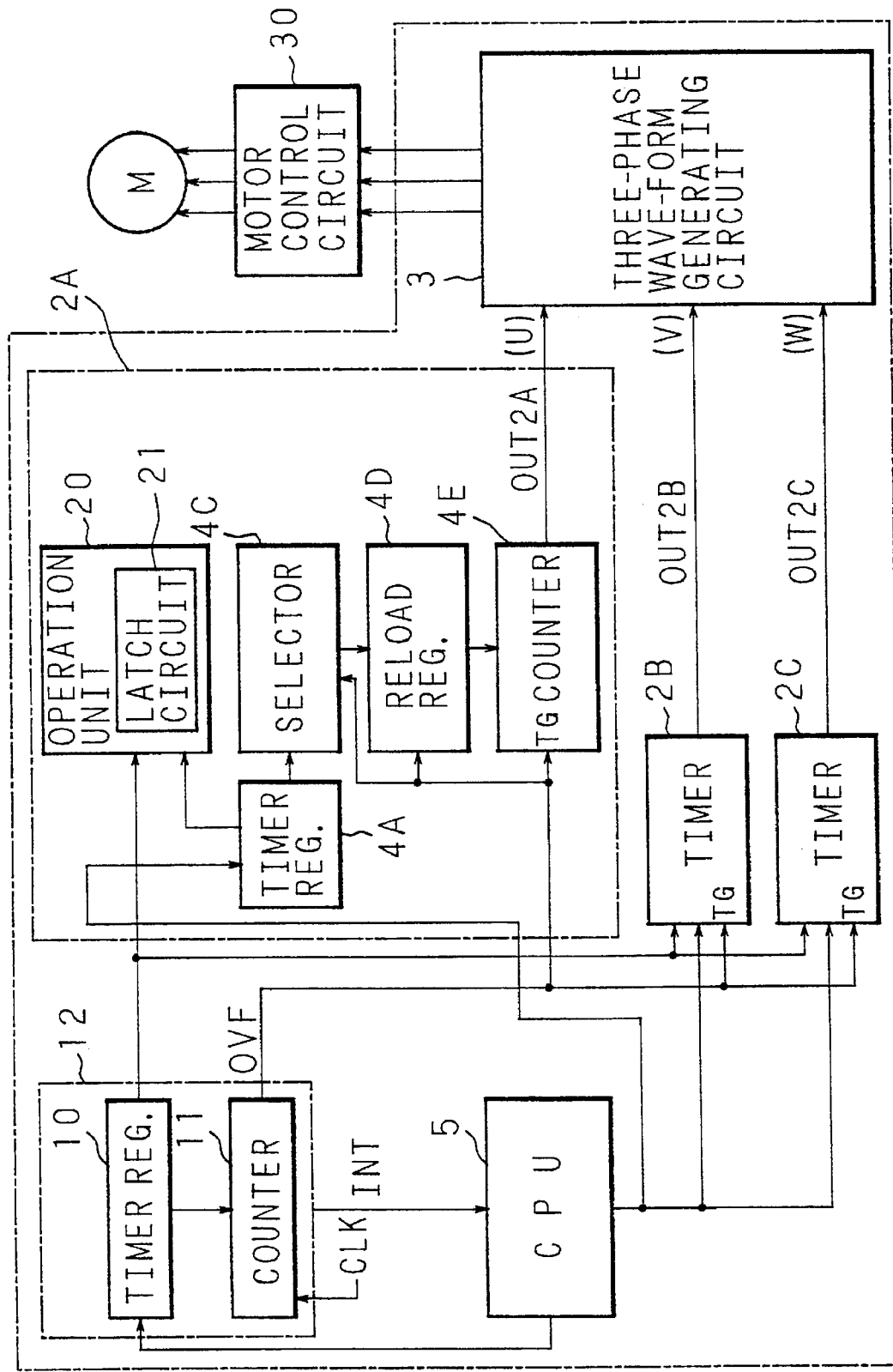
FIG. 5 is a block diagram showing a configuration example of a second invention of the microcomputer for driving induction motor according to the invention.

FIG. 5 is a block diagram showing a configuration example of a second embodiment of the microcomputer for driving induction motor according to the invention.

Data of a timer register 10 and a timer register 4A are supplied to an operation unit 20. The operation unit 20 contains a latch circuit 21 for holding a calculation result. The calculation result held by the latch circuit 21 is supplied to a selector 4C. The other constructions are the same as those shown in FIG. 3 except that the operation unit 13 and the timer register 4B are eliminated. Identical components are designates by the same reference numerals.

The operation of the second embodiment of the microcomputer for driving induction motor of the invention having the above-mentioned configuration will be described with reference to the timing chart of FIG. 4 showing the states of signals in various portions.

The period data output unit 12 operates in the same manner as that in the microcomputer shown in FIG. 3.

When the counter 11 outputs the overflow signal OVF as shown in FIG. 4, the time width data which is stored in the reload register 4D is loaded to the counter 4E at rising timing t1 of the overflow signal OVF. The counter 4E starts the count operation, and a one-shot signal P1 (whose time width is T1) having a time width corresponding to the time width data stored in the reload register 4D is supplied to the three-phase wave-form generating circuit 3 as shown in FIG. 4. At falling timing t11 of the overflow signal OVF, the selector 4C is activated to perform the switching operation, so that the time width data latched by the latch circuit 21 in the operation unit 20 is supplied to the reload register 4D.

When the next pulse of the overflow signal OVF is outputted as shown in FIG. 4, the time width data stored in the reload register 4D is loaded to the counter 4E at rising timing t2 of the overflow signal OVF, and the counter 4E starts the count operation. As a result, a one-shot signal P2 (whose time width is T2) shown in FIG. 4 is supplied to the three-phase wave-form generating circuit 3.

At falling timing t21 of the overflow signal OVF, the selector 4C performs the switching operation, so that the time width data stored in the timer register 4A is loaded to the reload register 4D. At the same time, the operation unit 20 subtracts the value of the time width data stored in the timer register 4A from the value of the period data (whose period time is T3) stored in the timer register 10, and the subtracted value of the time width data is latched by the latch circuit 21. These operations are repeated, and the time width data in the timer register 4A is rewritten, whereby the time widths (pulse widths) of the one-shot signals P1 and P2 shown in FIG. 4 are controlled.

When these one-shot signals P1 and P2 are supplied to the three-phase wave-form generating circuit 3, the three-phase wave-form generating circuit generates a U-phase inversion control signal #U shown in FIG. 4, i.e., a negative phase control signal for the U-phase control signal U. The U-phase inversion control signal #U rises at falling timing of the one-shot signal P1 and falls at falling timing of the one-shot signal P2.

As described above, when the predetermined time width data is written into the timer register 4A in accordance with the programs, the operation unit 20 performs the above-mentioned subtraction, and the latch circuit 21 holds the time width data of the calculation result irrespective of the programs. Therefore, it is unnecessary to dispose two timer registers into which the time width data is to be written, so that the area of the circuit pattern can be reduced. In addition, since the operation unit is disposed and the number of the timer registers is decreased, it is unnecessary for the programs to perform the calculation for determining the time width data by the CPU, and to perform the operation of writing the calculated time width data into the timer registers. As a result, the load on the CPU 5 can be reduced. The timers 2B and 2C operate in the same manner as the timer 2A, so that the time of the calculation operation of determining the time width data by the CPU and the time of the operation of writing the calculation result into the timer register can be shortened. As a result, the load on the CPU 5 can be significantly reduced. Since the time period of the control performed by the CPU 5 is shortened, the period of the carrier can be further shortened, and the frequency of the carrier can be increased, whereby the revolution of the three-phase motor M can be smoothly controlled.

In the embodiment, the subtraction result obtained in the operation unit 13 is supplied to the timer register 4B. Alternatively, the subtraction result may be supplied to the timer register 4A, and the positive phase time width data of the control signal may be stored in the timer register 4B. It is a matter of course that the alternative can attain the same effects.

As described above in detail, according to the first invention, the operation unit for subtracting a value of the positive phase predetermined time width of the control signal from a value of the predetermined period of the carrier is disposed, and the calculation result is supplied to the register. Accordingly, it is unnecessary to perform the operation of calculating the value of the time width data to be stored in the register, and the operation of writing the calculation result into the register under the control of the CPU in accordance with the programs. As a result, it is possible to provide a microcomputer in which the load on the CPU can be significantly reduced, and the control operation time of the CPU can be shortened, so that the frequency of the carrier is accordingly increased, and the revolution of the induction motor is more smoothly controlled.

According to the second invention, the operation unit which subtracts a value of the positive phase or negative phase predetermined time width of the control signal from a value of the predetermined period of the carrier, and which has holding means for holding the calculation result is disposed, and the held calculation result is supplied to the counter. Accordingly, it is possible to reduce the number of registers in which time width data is to be stored, and the area of the circuit pattern can be decreased. In addition, it is unnecessary to perform the operation of calculating the value of the time width data to be stored in the register and the operation of writing the data of the calculation result into the register which stores the calculation result under the control of the CPU. As a result, the invention can attain superior effects in that it is possible to provide a microcomputer in which the load on the CPU is significantly reduced, and the control operation time of the CPU can be shortened, so that the frequency of the carrier is accordingly increased, and the revolution of the induction motor is more smoothly controlled.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A microcomputer for controlling driving of an induction motor with use of control signals in a positive phase and a negative phase which are synchronized with a carrier, said microcomputer comprising:

period data outputting means for outputting period data which determines a period of said carrier;

first calculating means for calculating time width data for positive phase and negative phase of said control signals at a starting time of every two periods determined by said period data outputting means;

a timer unit including:

first storing means for storing time width data for positive phase of said control signals calculated by said first calculating means;

second calculating means for subtracting a value of the time width data stored in said first storing means from a value of said period data held by said period data outputting means at the starting time of each period determined by said period data outputting means;

second storing means for storing the subtraction result by said second calculating means as time width data for negative phase of said control signals;

selecting means for alternately selecting and outputting one of said time width data stored in said first storing means and said time width data stored in said second storing means at a starting time of each period determined by said period data outputting means; and counting means for counting a value of said time width data selected by said selecting means at the starting time of each period determined by said period data outputting means; and a wave-form generating circuit for generating a positive phase and negative phase of said control signals on the basis of a count value of said counting means.

2. A microcomputer as set forth in claim 1, wherein said induction motor is a three-phase induction motor, and three sets of said timer units are disposed correspondingly to the three phases.

3. A microcomputer for controlling driving of an induction motor with use of control signals in a positive phase and a negative phase which are synchronized with a carrier, said microcomputer comprising:

a period data output unit for outputting period data which determines a period of said carrier;

a CPU for calculating time width data for positive phase and negative phase of said control signals at a starting time of every two periods determined by said period data output unit;

a timer including:

a first register for storing time width data for positive phase of said control signals calculated by said CPU;

an operation unit for subtracting a value of the time width data stored in said first register from a value of said period data at the starting time of each period determined by said period data output unit; and a second register for storing the subtraction result by said operation unit as time width data for negative phase of said control signals calculated by said CPU;

a selector for alternately selecting and outputting one of said time width data stored in said first register and said time width data stored in second register at a starting time of each period determined by said period data output unit; and a counter for counting a value of said time width data selected by said selector at the starting time of each period determined by said period data output unit; and a wave-form generating circuit for generating a positive phase and negative phase of said control signals on the basis of a count value of said counter.

4. A microcomputer as set forth in claim 3, wherein said induction motor is a three-phase induction motor, and three sets of said timers are disposed correspondingly to the three phases.

5. A microcomputer for controlling driving of an induction motor with use of control signals in a positive phase and a negative phase which are synchronized with a carrier, said microcomputer comprising:

a period data output unit for outputting period data which determines a period of said carrier;

a CPU for calculating time width data for positive phase and negative phase of said control signals at a starting time of every two periods determined by said period data output unit;

a timer including:

a register for storing time width data for positive phase of said control signals calculated by said CPU;

an operation unit for subtracting a value of the time width data stored in said first register from a value of said period data at the starting time of each period determined by said period data output unit, said operation unit having a latch circuit for holding said subtraction result as time width data for negative phase of said control signals;

a selector for alternately selecting and outputting one of said time width data stored in said register and said time width data stored in said latch circuit at a starting time of each period determined by said period data output unit; and a counter for counting a value of said time width data selected by said selector at a starting time of each period determined by said period data output unit; and a wave-form generating circuit for generating a positive phase and negative phase of said control signals on the basis of a count value of said counter.

6. A microcomputer as set forth in claim 5, wherein said induction motor is a three-phase induction motor, and three sets of said timers are disposed correspondingly to the three phases.

7. A microcomputer for controlling driving of an induction motor with use of control signals in a positive phase and a negative phase which are synchronized with a carrier, said microcomputer comprising:

period data outputting means for outputting period data which determines a period of said carrier;

first calculating means for calculating time width data for positive phase and negative phase of said control signals at a starting time of every two periods determined by said period data outputting means;

a timer unit including:

first storing means for storing time width data for negative phase of said control signals calculated by said first calculating means;

second calculating means for subtracting a value of the time width data stored in said first storing means from a value of said period data held by said period data outputting means at the starting time of each period determined by said period data outputting means;

second storing means for storing a subtraction result by said second calculating means as time width data for positive phase of said control signals;

selecting means for alternately selecting and outputting one of said time width data stored in said first storing means and said time width data stored in said second storing means at a starting time of each period determined by said period data outputting means; and counting means for counting a value of said time width data selected by said selecting means at the starting time of each period determined by said period data outputting means; and a wave-form generating circuit for generating a positive phase and negative phase of said control signals on the basis of a count value of said counting means.

8. A microcomputer as set forth in claim 7, wherein said induction motor is a three-phase induction motor, and three sets of said timer units are disposed correspondingly to the three phases.

9. A microcomputer for controlling driving of an induction motor with use of control signals in a positive phase and a negative phase which are synchronized with a carrier, said microcomputer comprising:

a period data output unit for outputting period data which determines a period of said carrier;

a CPU for calculating time width data for positive phase and negative phase of said control signals at a starting time of every two periods determined by said period data output unit;

a timer including:

a first register for storing time width data for negative phase of said control signals calculated by said CPU;

an operation unit for subtracting a value of the time width data stored in said first register from a value of said period data at the starting time of each period determined by said period data output unit; and a second register for storing a subtraction result by said operation unit as time width data for positive phase of said control signals calculated by said CPU;

a selector for alternately selecting and outputting one of said time width data stored in said first register and said time width data stored in second register at a starting time of each period determined by said period data output unit; and a counter for counting a value of said time width data selected by said selector at the starting time of each period determined by said period data output unit; and a wave-form generating circuit for generating a positive phase and negative phase of said control signals on the basis of a count value of said counter.

10. A microcomputer as set forth in claim 9, wherein said induction motor is a three-phase induction motor, and three sets of said timers are disposed correspondingly to the three phases.

11. A microcomputer for controlling driving of an induction motor with use of control signals in a positive phase and a negative phase which are synchronized with a carrier, said microcomputer comprising:

a period data output unit for outputting period data which determines a period of said carrier;

a CPU for calculating time width data for positive phase and negative phase of said control signals at a starting time of every two periods determined by said period data output unit;

a timer including:

a register for storing time width data for negative phase of said control signals calculated by said CPU;

an operation unit for subtracting a value of the time width data stored in said first register from a value of said period data at the starting time of each period determined by said period data output unit, said operation unit having a latch circuit for holding said subtraction result as time width data for positive phase of said control signals;

a selector for alternately selecting and outputting one of said time width data stored in said register and said time width data stored in said latch circuit at a starting time of each period determined by said period data output unit; and a counter for counting a value of said time width data selected by said selector at a starting time of each period determined by said period data output unit; and a wave-form generating circuit for generating a positive phase and negative phase of said control signals on the basis of a count value of said counter.

12. A microcomputer as set forth in claim 11, wherein said induction motor is a three-phase induction motor, and three sets of said timers are disposed correspondingly to the three phases.

* * * * *